July 17, 1923.
N. TOBIASSON
1,462,253
AUTOMATIC FUNNEL
Filed May 16, 1922
2 Sheets-Sheet 2
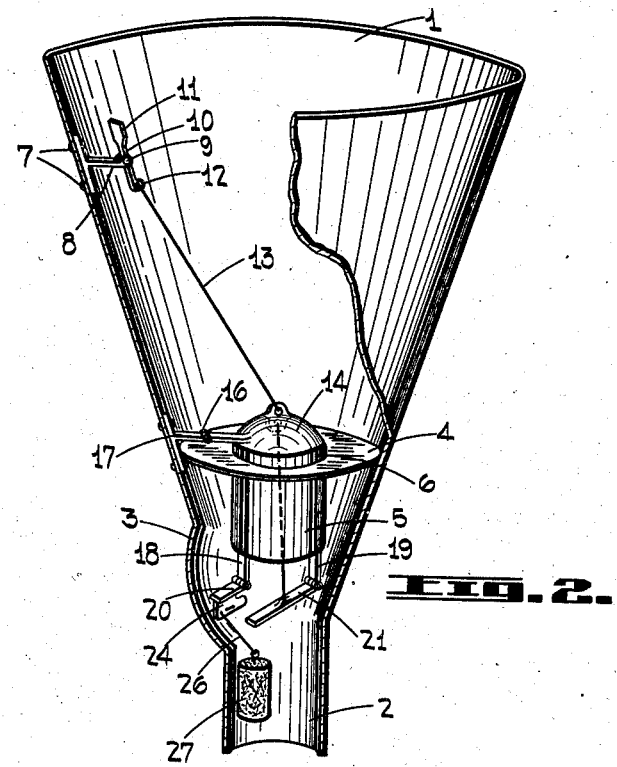
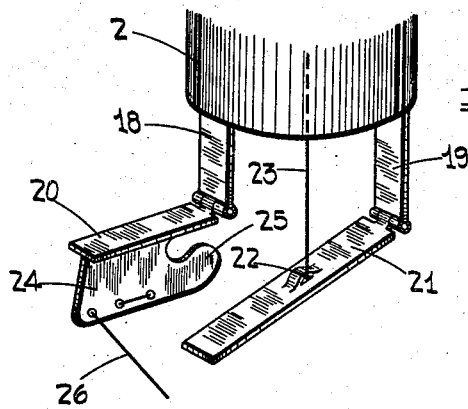
INVENTOR
NEILS TOBIASSON.
BY
ATTORNEY Patented July 17, 1923.

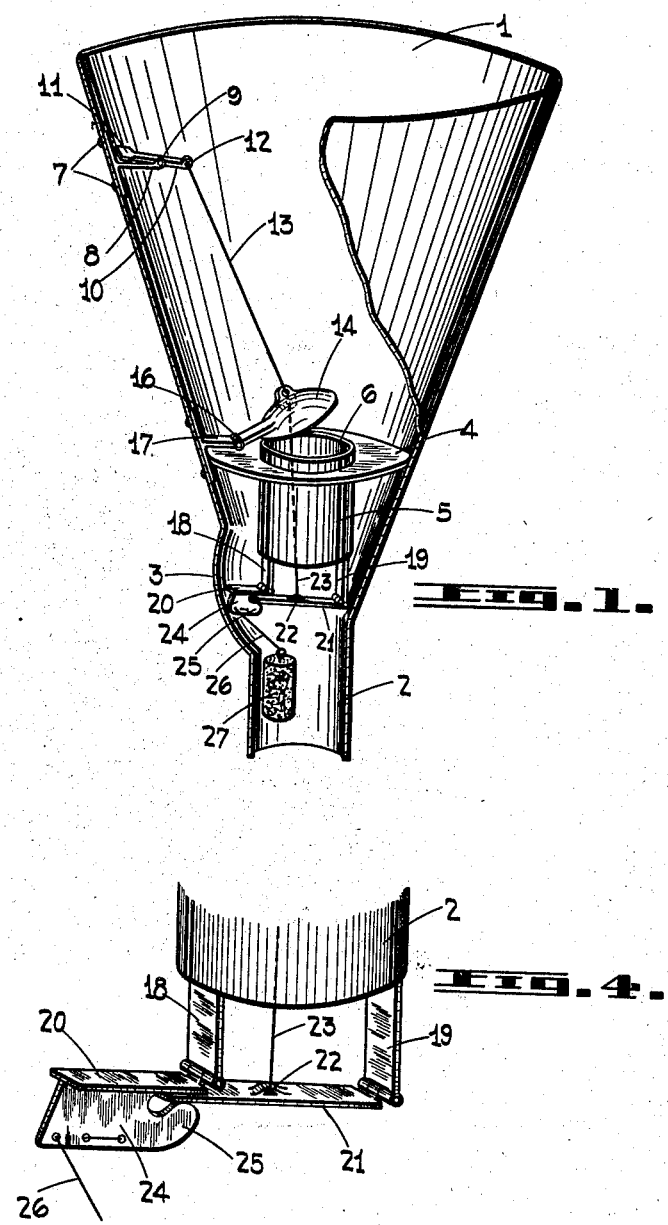

1,462,253

UNITED STATES PATENT OFFICE.

NEILS TOBIASSON, OF ORTON, ALBERTA, CANADA.

AUTOMATIC FUNNEL.

Application filed May 16, 1922. Serial No. 561,493.

*To all whom it may concern:*

Be it known that I, NEILS TOBIASSON, a citizen of the Dominion of Canada, residing at Orton, in the county of Macleod and Province of Alberta, have invented certain new and useful Improvements in Automatic Funnels, of which the following is a specification.

The present invention relates to funnels, and it particularly appertains to that type of device, known in the trade as "measuring funnels," and the principal object is to provide a funnel of the character described, which is adapted to automatically cut off the flow of the liquid, after a pre-determined quantity of the same has passed therethrough.

A further object is to provide a funnel embodying mechanism for automatically opening and closing a valve, controlling the liquid supply to a container to be filled with the liquid, and whereby the funnel may be transferred from one container to another, thus obviating the spilling of the liquid contents of the same.

With these and other objects in view, the invention consists in the construction, combination and arrangement of parts as will be hereinafter fully described, illustrated in the accompanying drawings, and pointed out in the claims hereunto appended.

Fig. 1 is a perspective view of the improved funnel, illustrating the valvular mechanism, with the latter illustrated in open position.

Fig. 2 is a similar view, illustrating the valvular mechanism in closed position.

Fig. 3 is a magnified fragmental perspective view of a part of the valvular mechanism, with certain elements in unlocked position; and Fig. 4 is a similar view of the latch element in closed or locked position.

Referring to the drawings, like numerals designate like parts in the various drawings.

The numeral 1 designates a sheet of metal, having its end portions soldered together and forming a utensil of substantially frusto-conical configuration, which is formed adjacent its lower end with a tubular extension, which latter, is adapted for insertion within the necks of bottles, or other suitable containers to be filled with liquid from the said funnel. The funnel adjacent its lower tubular end 2, has a portion of its wall outwardly swelled at 3 and a disk 4 has its peripheral edge soldered to, or wedged against, the inclined wall of the funnel above the swelled portion 3. This disk 4 is provided with a central opening and disposed within this opening and suitably connected to the disk is a hollow tubular member 5, the upper portion 6 of which extends above the upper surface of the disk 4, while the lower portion of said tube projects downwardly to a point adjacent the medial point of the outwardly swelled part 3 of the funnel. Secured to the upper inclined interior wall of the funnel by rivets 7, is a bracket 8, and connected to said bracket by a pin 9 is a lever 10. The upper part of lever 10 is formed with an enlarged portion 11, while the lower end is provided with an eyelet 12, through which is passed the upper end of a wire 13, and the lower end of said wire is attached to a valve plate 14. This valve plate 14 is hingedly connected at 16 to a bracket 17, which is preferably riveted to the interior of the wall of the funnel, below bracket 8. The valve plate 14 is preferably stamped out of sheet metal in concave-convex configuration, and is adapted upon the release of the lever member 10 to be lowered to dispose the same over the upper open end of the tubular member 5, to prevent the passage of the liquid contained in the upper part of the funnel from passing through the said tubular member 5 and into the bottle or receptacle to be filled.

Fastened to the lower end of the tubular member 5, preferably by soldering, are the oppositely disposed strap members 18 and 19, which have hingedly connected thereto, the catch member 20 and the latch member 21. The latch member 21 at its medial part, is formed with an upstanding lug 22, which latter is provided with an opening, through which is passed the lower end of a relatively rigid piece of wire 23, the upper end of which is connected to the valve plate 14 at substantially the central part of its lower surface. The catch member 20 is formed with a downwardly projecting portion 24, formed with a hook 25 which is adapted for engagement with the free end of the latch member 21.

Connected by a rigid piece of wire 26 to the portion 24 of catch member 20, is a float 27, which latter is disposed within the tubular extension 2 of the funnel, and the function of this float member 27, which is preferably constructed of a piece of cork, is to elevate the catch member 20 from engagement with the 3 end of latch 21, so that the latter, in consequence of its weight, will gravitate downwardly and cause the lowering of the valve plate 14, by the medium of the connecting wire 23 disposed therebetween.

In operation, the valve plate 14 is in a position illustrated in Fig. 2, namely, closed, and the liquid is poured into the upper part of the funnel. The funnel is then transferred to the receptacle or bottle to be filled, and in the latter case, the tubular extension 2 is inserted within the neck of the bottle. The operating lever 10 is now actuated by pressure upon the enlarged portion 11, which through the wire 13 elevates the valve plate 14, thus allowing the liquid contained in the upper part of the funnel to pass through the tubular member 5 and tubular extension 2 and into the bottle to be filled.

Upon the filling of the bottle, the liquid will extend well up within the neck of the same, and the float 27, resultant of the pressure of the liquid thereupon, will be forced upwardly. As the float 27 is connected by the rigid wire 26 to the catch member 20, the latter is elevated out of contact with the free end of the latch member 21. Upon the release of the latch member, the same assumes the position illustrated in Fig. 2, and consequently the valve plate 14 is actuated to cover the open top of the tubular member 5, which, as before stated, controls the communication between the upper and lower parts of the funnel.

It is obvious that by the provision of this automatic cut-off mechanism as illustrated, a pre-determined quantity of liquid may be poured into a bottle or container, and the latter when filled, will cause the float valve 27 to be elevated, to actuate the valve plate 14.

It is likewise obvious that the funnel proper, and all of the elements above described, may be stamped out of sheet metal, and an ordinary bottle cork may be used as the float element.

From the foregoing, it is thought that the construction of my invention will be clearly understood, and, therefore, a more extended explanation has been omitted.

Having thus described my invention, what I claim as new is:

1. A device of the character described, comprising a casing, a tubular extension formed with said casing, a disk dividing the casing into upper and lower sections, a tubular member disposed in said disk and communicating with the casing sections, a valve plate arranged on said tubular member for closing the same, a latch member arranged on said tubular extension, a wire connection between said valve plate and latch, a catch member connected to said extension and adapted for engagement with said latch, a float member connected to the catch member, the tubular extension of said casing adapted for insertion within the neck of a bottle to be filled, a rigid connection between the said float and catch member, and the said catch member being adapted for release from the latch member upon the elevation of said float member.

2. A funnel comprising a conical casing, an extension formed with said casing, a disk arranged between the casing and extension, a tubular member connected to said disk, a bracket secured to the interior wall of said casing, a similar bracket disposed below the first mentioned bracket, a plate hingedly connected to the second mentioned bracket and adapted to close the upper end of said tubular member, a lever hingedly mounted on the first mentioned bracket, a connection between said lever and plate, a latch member connected to the tubular member, a catch member for engaging the said latch member, a float element arranged in the casing extension, a rigid connection between the catch and float, the said casing extension adapted for insertion within a receptacle to be filled, and the said float upon the filling of the receptacle, being adapted to be elevated to disengage the catch from the latch, whereby the plate is lowered to close the communication through the said tubular member.

3. A funnel comprising a casing, an extension formed integral with said casing, a disk connected to said casing, a tubular member attached to said disk, brackets secured to the interior wall of said casing, a plate hingedly connected to one of said brackets, a lever connected to the other of said brackets, a wire connection between the said lever and plate, latch and catch elements arranged on said tubular member, a wire connection between said plate and latch, a float arranged in said casing extension, a rigid connection between the float and catch, the said float adapted for elevation of fluid in the casing extension to disengage said latch for actuating said plate to closed position upon said tubular member.

In testimony whereof, I affix my signature in the presence of two witnesses.

NEILS TOBIASSON.

Witnesses:
NORMAN SHURTLIFF,
Mrs. S. R. WHITEHEAD.